US008832480B2

(12) United States Patent
Lee et al.

(10) Patent No.: US 8,832,480 B2
(45) Date of Patent: Sep. 9, 2014

(54) AUTOMATIC MODE SWITCH PORTABLE ELECTRONIC DEVICE

(75) Inventors: Yen-Lin Lee, Hsinchu Hsien (TW); Shan-Cheng Sun, Hsinchu Hsien (TW); Chih-Cheng Ku, Hsinchu Hsien (TW); He-Ge Chen, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 493 days.

(21) Appl. No.: 13/102,190

(22) Filed: May 6, 2011

(65) Prior Publication Data

US 2012/0023353 A1     Jan. 26, 2012

(30) Foreign Application Priority Data

Jul. 21, 2010  (TW) ................................ 99123971 A (51) Int. Cl.
*G06F 1/32* (2006.01)
*H04N 13/04* (2006.01)

(52) U.S. Cl.
CPC ...... H04N 13/0438 (2013.01); *H04N 2213/008* (2013.01); H04N 13/0497 (2013.01); G06F 1/3287 (2013.01); *Y02B 60/32* (2013.01); G06F 1/3231 (2013.01)
USPC .......... 713/323; 713/300; 713/310; 713/320; 713/321; 713/322; 713/324; 713/330; 713/340; 348/56

(58) Field of Classification Search
USPC ................. 713/300, 310, 320–324, 330, 340; 348/E13.036, 56
See application file for complete search history.

(56) References Cited

U.S. PATENT DOCUMENTS

| 7,327,850 | B2 * | 2/2008 | Crump et al. ................. 381/74 |
| 8,073,154 | B2 * | 12/2011 | Crump et al. ................. 381/74 |
| 8,238,590 | B2 * | 8/2012 | Burge ............................ 381/309 |
| 2004/0233178 | A1 * | 11/2004 | Silk et al. ....................... 345/179 |
| 2006/0013079 | A1 * | 1/2006 | Rekimoto ................... 369/30.01 |
| 2010/0120406 | A1 * | 5/2010 | Banga et al. ................. 455/418 |
| 2011/0077056 | A1 * | 3/2011 | Park et al. .................. 455/569.1 |
| 2011/0126034 | A1 * | 5/2011 | Siegel et al. .................. 713/320 |

FOREIGN PATENT DOCUMENTS

TW              520772          2/2003

OTHER PUBLICATIONS

TW Office Action dated Jul. 24, 2013, 10 pages.

* cited by examiner

*Primary Examiner* — M Elamin
(74) *Attorney, Agent, or Firm* — Edell, Shapiro & Finnan, LLC (57) ABSTRACT

A portable electronic device having automatic power supply mode switching is provided. The portable electronic device includes a micro-sensor and a control circuit. The control circuit controls operations of the electronic device, the micro-sensor senses whether the electronic device is carried or worn by a user. When the electronic device operates in a normal mode, and if the electronic device is not carried or worn for a time longer than a buffer period of a predetermined interval, the control circuit switches to a sleep mode, which results in lower power consumption.

17 Claims, 6 Drawing Sheets

| | Status | micro sensor | communication module | Left lens | Right Lens | Lens controller | Sync controller | Timer | Power manager |
|---|---|---|---|---|---|---|---|---|---|
| S1 | Normal mode | On | On | On | On | On | On | On | On |
| S2 | Standby mode | On | On | On | On | On | On | On | On |
| S3 | Sleep mode | On | Off | Off | Off | Off | Off | On | On |
| S4 | Turn-off mode | Off | Off | Off | Off | Off | Off | Off | Off |

| Status | | micro sensor | communication module | Left lens | Right Lens | Lens controller | Sync controller | Timer | Power manager |
|---|---|---|---|---|---|---|---|---|---|
| S1' | Normal mode | On | On | On | On | On | On | On | On |
| S2' | Auto-lock mode | On | On | On | On | On | On | On | On |
| S3' | Sleep mode | On | On | Off | Off | Off | Off | On | On |
| S4' | Turn-off mode | Off | Off | Off | Off | Off | Off | Off | Off |

Figure 6

AUTOMATIC MODE SWITCH PORTABLE ELECTRONIC DEVICE

CROSS REFERENCE TO RELATED PATENT APPLICATION

This patent application is based on Taiwan, R.O.C. patent application No. 099123971 filed on Jul. 21, 2010.

FIELD OF THE INVENTION

The present invention relates to an automatic mode switch portable electronic device, and more particularly, to a portable electronic device which can automatically switch operation modes when it is not worn by a user.

BACKGROUND OF THE INVENTION

The size and weight of portable electronic devices have decreased significantly. Such electronic devices can be carried or worn by a user to provide service. As an example, 3D image displaying systems are currently experiencing explosive growth. As a result, associated devices such as shutter glasses used with 3D video players have seen an increase in use as well. A 3D video player can display a left image and right image, alternately, in order while it sends sync signals to the shutter glasses. After receiving a sync signal, the shutter glasses cause the left and right lenses to switch between an open and shielding state, respectively according to the timing of the sync signal. This enables users wearing the shutter glasses to see a left image with the left eye, and to see a right image with the right eye, so that the user perceives the correct 3D image. Another portable electronic device that is widely used is a Bluetooth headset Such a device can wirelessly receive an audio signal to play sound for a user.

SUMMARY OF THE INVENTION

Portable electronic devices rely on battery power to operate, in view of portability. Since battery power is very limited, power-saving designs in portable electronic devices are desired. A conventional portable electronic device that employs a manual power switch only stops operating when a user turns off the electronic device manually via the switch. However, if the user does not turn off the electronic device via the power switch, the portable electronic device continues consuming battery power until the battery is drained.

Accordingly, a portable electronic device that automatically switches its power management mode according to usage status to save battery power is described herein.

An object of the present disclosure is to provide an automatic mode switch portable electronic device which includes a micro-sensor and a control circuit. The micro-sensor senses whether the electronic device is worn/carried to generate a sensing signal accordingly. The control circuit is coupled to the micro-sensor for determining whether to switch the portable electronic device to another operation mode according to the sensing signal and the present mode.

When the control circuit operates in a normal mode, if the sensing signal that changes indicates that the electronic device is not worn/carried, the control circuit controls the operation mode to switch to a standby mode.

The control circuit includes a timer for generating a timing result. If the timing result is less than a first time length when the control circuit operates in the standby mode while the sensing signal changes (e.g. restoring to the signal state of the normal mode), it indicates that the electronic device is being worn/carried again, thus the control circuit determines to switch back to the normal mode. Correspondingly, if the timing result is longer than the first time length when the control circuit operates in the standby mode while the sensing signal stays unchanged, it indicates that the electronic device has not been used for more than the first time length, thus the control circuit switches to operate in a sleep mode, which consumes less power.

When the control circuit operates in the sleep mode, if the timing result is less than a second time length while the sensing signal changes (e.g., restoring to the signal state of the normal mode), it indicates that the electronic device is worn/carried by the user again, and the control circuit may switch back to the normal mode. Correspondingly, when the control circuit stays in the sleep mode if the timing result is longer than the second time length while sensing signal stays unchanged, it indicates that the electronic device is not worn/carried for a duration long enough so that the control circuit may switch to a turn-off mode. In the turn-off mode, the control circuit stops controlling the electronic device to work.

The electronic device may be equipped with a switch (power switch), wherein the switch is coupled to the control circuit, and controlled by the user (e.g., via a push or push-to-release switch). The timer receives the sensing signal from the micro-sensor, for counting the duration that the control circuit operates in the standby mode and the sleep mode as the timing results. In an embodiment of the present disclosure, the control circuit is further equipped with a power manager and a function controller. The power manager supplies power according to the present mode in which the control circuit operates; the function controller is coupled to the power manager. The power manager selectively supplies function power to the function controller according to the present operation mode.

When the control circuit operates in the normal mode or the standby mode, the power manager supplies the function power and a sensing power. When the control circuit operates in the sleep mode, the power manager continues supplying the sensing power, but stops supplying the function power. When the power manager stops supplying the function power in the sleep mode, the function controller stops working for power-saving goal. Similarly, the micro-sensor is coupled to the power manager to receive the sensing power for sensing. According to an embodiment of the present disclosure, the electronic device is a pair of shutter glasses for viewing a 3D image. The glasses include two function controllers, two lenses and a communication module. One of the function controllers is a sync controller, coupled to the communication module; the function controller operates to control the communication module to perform the communication function, such as receiving the sync signal sent from the 3D image player, so that the sync controller can provide a timing sequence signal. The other function controller is a lens controller, coupled to the two lenses; the lens controller operates to drive the two lenses to switch between shielding and non-shielding states according to the timing sequence signal, so the user can view a 3D image.

It is desirable that the portable electronic device receive data from external signal sources (such as a 3D video player) to provide various services for the user. Therefore, the portable electronic device of the present invention provides the functionality that the electronic device automatically switches its mode of operating (i.e., the power management mode mentioned above) according to the whether the electronic device is worn/carried by the user, as well as whether the electronic device is receiving data from signal sources.

Another object of the present disclosure is to provide an electronic device with a communication module and a control circuit. The communication module detects whether a communication signal exists to generate a communication indication signal accordingly. The control circuit is coupled to the communication module so that the control circuit can be switched among different operation modes (such as the normal mode, standby mode, sleep mode and turn-off mode) according to the communication indication signal and the present operation mode. If the communication indication signal changes when the control circuit operates in the standby mode, the control circuit switches the mode. If the control circuit stays in the standby mode for a duration no longer than a first time length when the sensing signal changes, then the control circuit switches back to the normal mode; if the duration is longer than the first time length, then the control circuit will switch to the sleep mode. If the control circuit stays in the sleep mode for a time no longer than a second time length when the control circuit operates in the sleep mode while the sensing signal changes, then the control circuit switches back to the normal mode; if the time is longer than the second time length, then the control circuit will switch to the turn-off mode.

According to an embodiment of the present disclosure, the predetermined communication signal detected by the communication module is a sync signal sent from a 3D video player. When the sync signal can not be detected by the communication module, the signal state of the communication indication signal changes, which causes the control circuit to switch to the standby mode from the normal mode accordingly. In accordance with another embodiment of the present disclosure, the predetermined communication signal detected by the communication module is an interrupt signal and an initial signal of playing. The 3D video player sends the interrupt signal when the 3D video playing is paused and/or stopped, and when the communication module detects the interrupt signal, it generates the communication indication signal accordingly to cause the control circuit to switch to another mode from the normal mode. Similarly, the electronic device turns back to normal mode when detecting the initial signal from the communication indication signal. In accordance with an embodiment of the present disclosure, the electronic device also can integrate the sensing signal of the micro-sensor with the communication indication signal of the communication module to perform auto mode switching.

The advantages and spirit related to the present invention can be further understood via the following detailed description and drawings.

The following description and figures are disclosed to gain a better understanding of the advantages of the present invention.

DETAILED DESCRIPTION OF THE PREFERRED EMBODIMENT

The electronic devices according to the embodiments of the present disclosure can be realized as 3D shutter glasses or a wireless headset. Please note that the types of devices are provided only as an example and do not limit the scope of the present invention.

Figure 1:
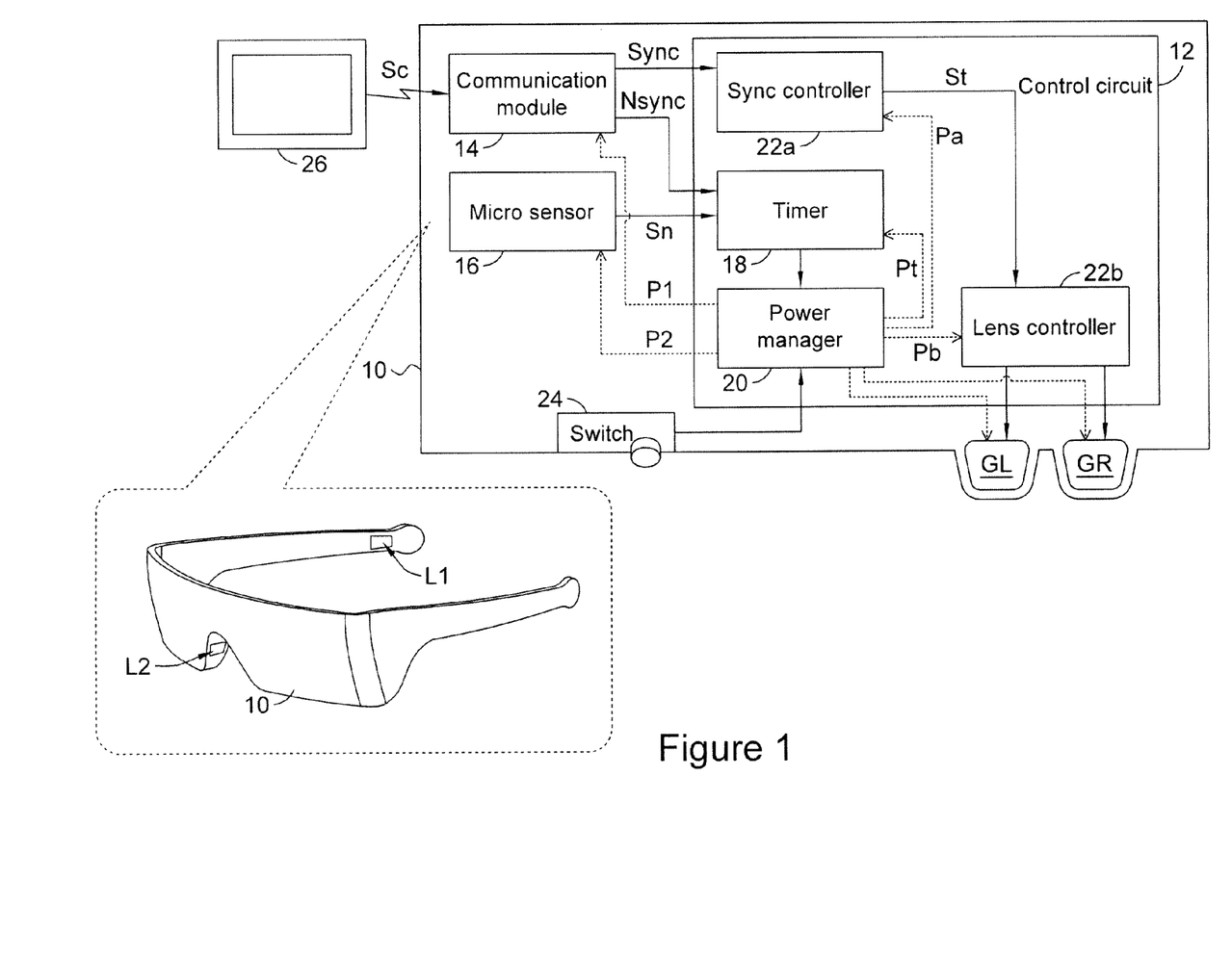
FIG. 1 illustrates an electronic device according to an embodiment of the present disclosure.

FIG. 1 is a schematic view of electronic device 10 according to an embodiment of the present disclosure. The electronic device 10 is an automatic mode switch portable electronic device. In the embodiment with reference to FIG. 1, the electronic device is a pair of shutter glasses for viewing a 3D image, for illustrating the application of the present disclosure. The electronic device 10 works with a signal source 26; for example, the shutter glasses 10 in the present embodiment operate according to the signal source 26 of a 3D video player. The electronic device 10 includes a control circuit 12, a communication module 14, a manual switch 24, two lenses GL and GR; the electronic device 10 can further include a micro-sensor 16. The control circuit 12 includes a timer 18, a power manager 20 and two function controllers including sync controller 22a and lens controller 22b.

In the electronic device 10, the control circuit 12 mainly controls the operation of the electronic device 10. The micro-sensor 16 senses whether the electronic device 10 is carried/worn by the user to generate a sensing signal Sn accordingly; the control circuit 12 is coupled to the micro-sensor 16 for receiving the sensing signal Sn. The switch 24 is a power switch coupled to the control circuit 12, where the switch is controlled by the user; for example, it can be a push button that can be pushed or push-released. When the switch is turned on, an electronic signal triggers the power manager 20 of the control circuit 12 to operate. The power manager 20 controls power supply to the lens GL and GR, the timer 18, the sync controller 22a, the lens controller 22b, the communication module 14 and the micro-sensor 16. For example, the power manager 20 may regulate the power supply from the power source (such as battery) that supplies the communication power P1, the sensing power P2, the clocking power Pt, the function power Pa and Pb to the communication module 14, the micro-sensor 16, the timer 18, the sync controller 22a and the lens controller 22b to optimize power consumption.

The left lens and right lens GL and GR of the electronic device 10 are coupled to the lens controller 22b of the control circuit 12; the lens controller 22b can drive the lens GL and GR to switch between the shielding and non-shielding states according to a timing sequence signal St, when the function power Pb is supplied. In one example the lens GL and GR are made of liquid crystal; the liquid crystal array of the lens GL and GR may be changed by the lens controller 22b to have different orientation angles and arrangements such that the transparencies of the liquid crystal lens GL and GR are changed accordingly. The communication module 14 is coupled to the sync controller 22a of the control circuit 12, it may be a wired and/or wireless (such as infrared, Bluetooth or RF wireless) receiver; when the sync controller 22a operates with supply of the function power, the communication module 14 operates to receive signals from the signal source 26, and to generate corresponding actions to the sync controller 22a of the control circuit 12.

The following embodiment of the present invention illustrates achieving the electronic device 10 as a pair of shutter glasses that function with 3D video signal source 26. Signal source 26 may provide the left image frame and the right image frame alternately, while a sync signal Sc comes along with the left image frame and right image frame. When the communication module 14, the sync controller 22a and the lens controller 22b operate with supply of the communication power P1, the function power Pa and Pb respectively, the communication module 14 receives the sync signal from the signal source 26, and provides a responding sync signal Sync to the sync controller 22a of the control circuit. In response to the sync signal Sync, the sync controller 22a provides a time sequence signal St to the lens controller 22b to drive the lens GL and GR to switch between open and shielding respectively. For example, when the signal source provides the left image frame, the left lens GL is open (not shielding) and the right lens GR is shielding; when the signal source provides the right image frame, the left lens GL is synchronously shielding and the right lens GR is open; in this way, the user wearing the electronic device 10 can perceive a 3D image by viewing the left image frame from left eye, and viewing the right image frame from right eye in turns.

Figure 2:
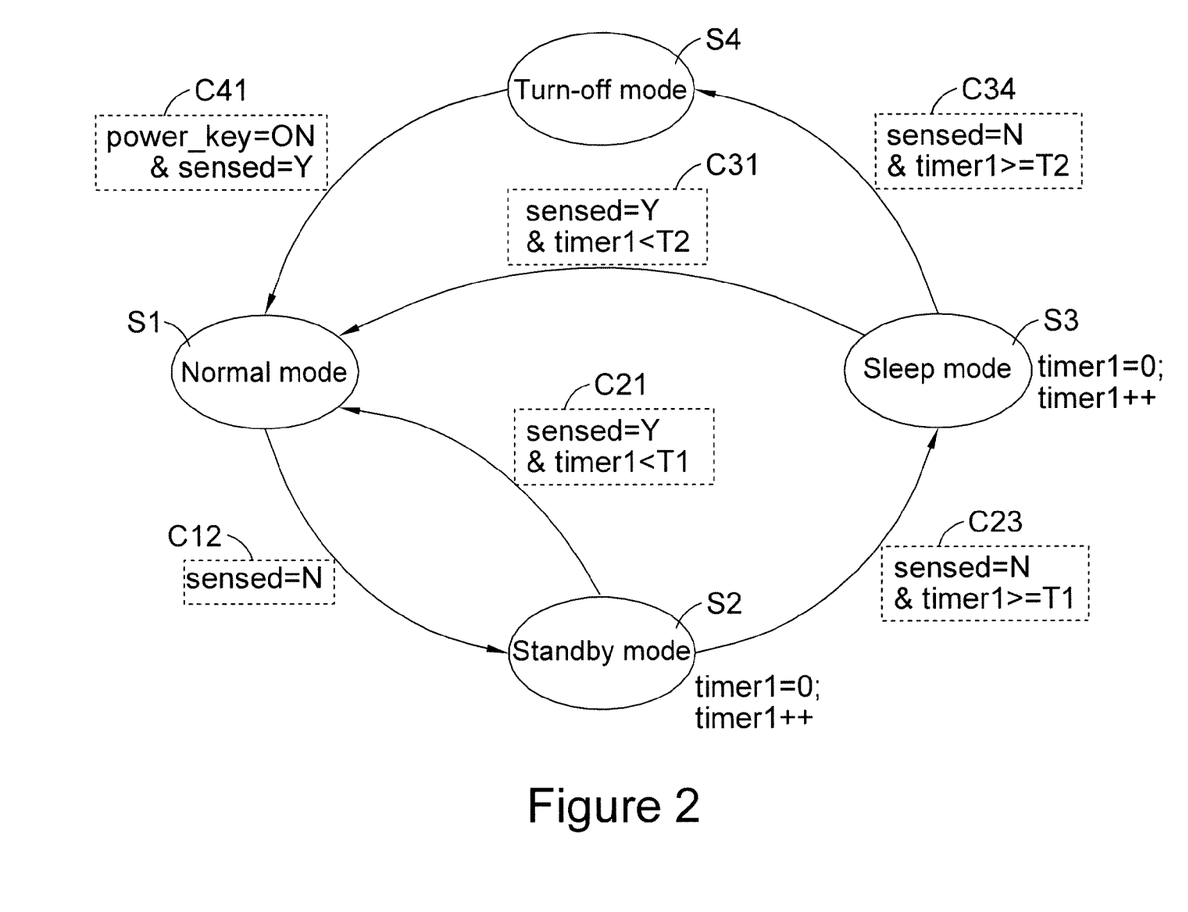
FIG. 2 is a schematic diagram of a state mechanism of the electronic device shown in FIG. 1 according to an embodiment of the present disclosure.

The shutter glasses need to supply power to provide 3D viewing functionality to the user. The user can control (such as pressing) the switch 24 to control on and off of the electronic device 10. In order to compensate for the deficiency of the manual power control, the electronic device 10 according to the embodiments of the present invention automatically switches the operation modes of different levels of power supply by detecting operating status of the electronic device by the micro-sensor 16, so that an efficient power consumption of the portable electronic device is achieved so as to extend usage time. FIG. 2 illustrates a mode-switching mechanism that the electronic device 10 realizes according to an embodiment of the present disclosure. In FIG. 2, the electronic device 10 is able to switch among four states S1-S4, which correspond to normal mode, standby mode, sleep mode and turn-off mode respectively.

When the control circuit 12 (shown in FIG. 1) operates in the normal mode S1, the power manager 20 provides the communication power P1, the sensing power P2, the clocking power Pt, the function power Pa and Pb as well as power to the lens GL and GR, so that the electronic device 10 is able to work with full functionality. If the sensing signal Sn changes and indicates that the electronic device 10 is not worn by the user (in FIG. 2, [sensed=N] in condition C12), the control circuit 12 may automatically switch to the standby mode S2.

In the control circuit 12, the timer 18 (shown in FIG. 1) is coupled to the micro-sensor 16; after the control circuit 12 operates in the state S2, the timer 18 is triggered in response to the change of the sensing signal Sn to start to calculate the duration in which the control circuit 12 operates in the state S2, to provide a timing result. For example, the timer 18 periodically accumulates from an initial value 0 in a register timer1 (for example, add 1 to the value of the timer1 every other unit time, [timer1=0; timer1++] as shown in FIG. 2).

If the control circuit 12 operates in the state S2 for a duration shorter than a first time length T1 while the sensing signal Sn changes (for example, restored to the signal state of the normal mode) which indicates that the electronic device 10 is worn/carried again, then it means that the condition C21 ([sensed=Y & timer 1<T1]) is satisfied, and the control circuit 12 may switch back to the normal mode S1.

Correspondingly, if the duration that the control circuit 12 operates in the state S2 is longer than a buffer period of the first time length T1 while the sensing signal Sn stays unchanged, it indicates that the electronic device 10 is not worn/carried by the user in the buffer period, which means that the electronic device 10 stays in an idle state for more than the first time length T1. In this case, the condition C23 ([sensed=N & timer1>=T1]) is satisfied, thus the control circuit 12 switches to the sleep mode S3 that reduces power consumption.

In the sleep mode of state S3, the power manager 20 of the control circuit 12 stops supplying power for the lens GL and GR, as well as the communication power P1, the function power Pa and Pb. In this way, it can effectively decrease power consumption of the electronic device 10. The power manager 20 may continue supplying the timer power Pt and sensing power P2, so the timer 18 can continue counting time duration in which the control circuit 12 does not operate in the normal mode; for example, as the control circuit 12 enter state S3, the timer 18 resets the register timer1 to the initial value (such as 0), then starts to accumulate the time duration in which the control circuit 12 operates in state S3. Furthermore, the micro-sensor 16 also continues to detect whether the electronic device 10 is worn by the user again.

When the control circuit 12 operates in the sleep mode (state S3) for shorter than a second time length T2, while the sensing signal Sn changes again (for example, restored to the signal state of the normal mode), it indicates that the electronic device 10 is worn/carried again, then the condition C31([sensed=Y & timer1<T2]) is satisfied. Therefore, the control circuit 12 may switch back to the normal mode S1, in which the lens GL and GR, the communication module 14, the sync controller 22a and the lens controller 22b all are restored to an operating mode, and provide service to the user again.

Correspondingly, if the control circuit 12 operates in state S3 for longer than a second time length T2 while the sensing signal Sn stays unchanged, it indicates that the electronic device 10 is not worn by the user any more for the second time length T2, then the condition C34 ([sensed=N & timer1>=T2]) is satisfied, which means the control circuit 12 may switch to state S4, i.e. the turn-off mode.

Figure 3:
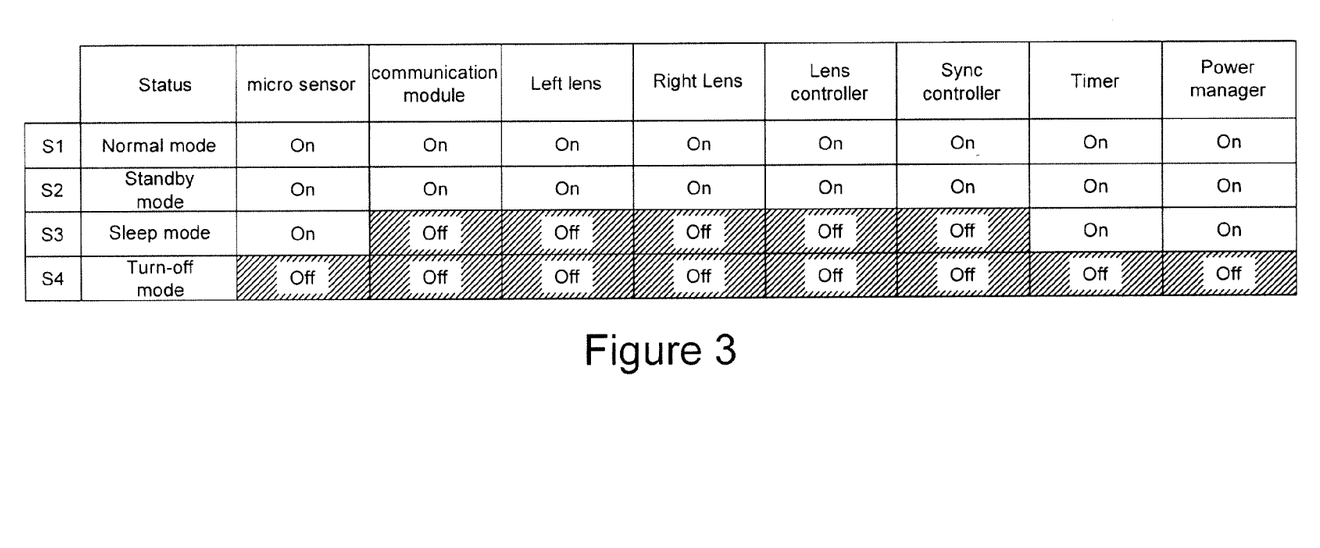
FIG. 3 is a table of the power management of the state mechanism shown in FIG. 2 according to an embodiment of the present disclosure.

In the turn-off mode, the control circuit 12 stops power supply completely, so the electronic device 10 stops working accordingly. In this embodiment, after the control circuit 12 switches to the turn-off mode, if the switch 24 (showing in FIG. 1) receives user control such as pushing or pressing, then the switch is turned on to provide power to the micro-sensor 16, which is able to sense whether the electronic device 10 is worn again. If yes, it means that the condition C41 ([power_key=ON & sensed=Y]) is achieved, where the control circuit 12 begins to operate in the normal mode S1. In another embodiment, after the control circuit 12 switched to the turn-off mode S4, if the switch 24 (shown in FIG. 1) receives the control (such as pressing) from the user, then the control circuit 12 determines to switch to the normal state S1. FIG. 3 illustrates the power management in each mode shown in FIG. 2, using [On] to represent that the control circuit 12 operates to enable power supply to functional elements, using and [Off] to represent that the control circuit 12 stop power supply to certain functional elements. In certain modes, part of the power supply stops to decrease power consumption. For example, in the normal mode S1 and the standby mode S2, the micro-sensor 16, the communication module 14, the left lens GL, the right lens GR, the lens controller 22b, the sync controller 22a, the timer 18 and the manager 20 all operate normally. When the control circuit 12 operates in the sleep mode S3, the power manager 20 continues supplying the timing power Pt and the sensing power P1 without supplying the communication power P2, the function power Pa and Pb, or power to lens GL and GR, so unnecessary power consumption is decreased. As shown in FIG. 3, both in the standby mode S2 and the sleep mode S3, the timer 18 continues counting time, and the micro-sensor 16 also continues performing the sensing function; once the micro-sensor 16 senses that the electronic device 10 is carried/worn by the user, the control circuit 12 may turn to the normal mode.

Figure 4:
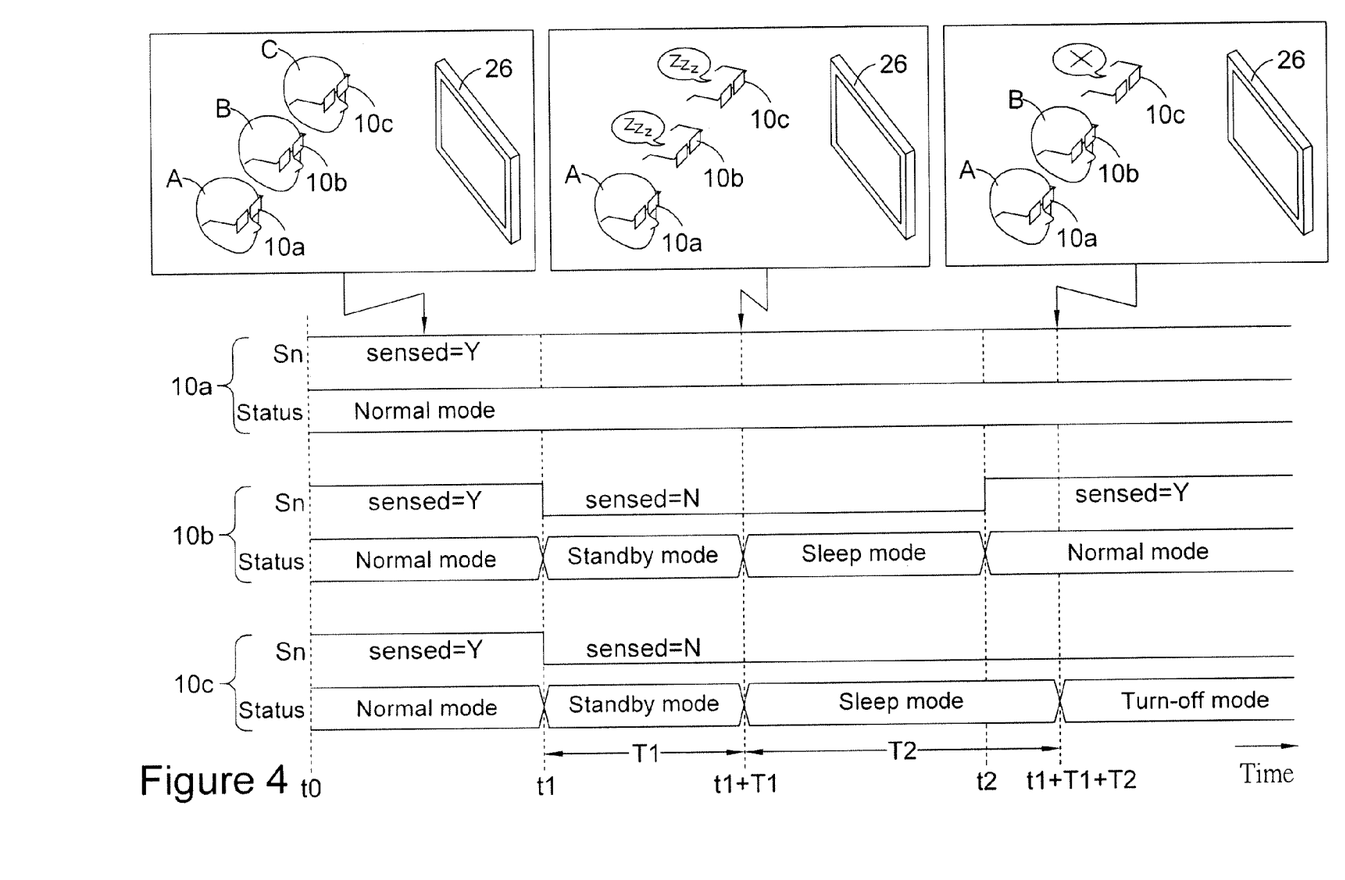
FIG. 4 is a schematic diagram of the application of the state mechanism according to an embodiment of the present disclosure.

FIG. 4 illustrates a schematic status diagram of the application of the electronic device 10 according to one embodiment of the present disclosure. In the beginning, at a time point t0, assuming that three users A, B and C are wearing the shutter glasses 10a, 10b and 10c respectively to view the 3D image from the signal source 26, and the shutter glasses 10a to 10c are taken as the electronic device 10 shown in FIG. 1. Accordingly, the micro-sensors of the shutter glasses 10a to 10c detect that they are being used, so the shutter glasses 10a to 10c operate in the normal mode S1 (FIG. 2).

At time point t1, assume that users B and C take off the shutter glasses 10b and 10c without manually turning off the power switch of the shutter glasses 10b and 10c. At this time, the sensing signals Sn of the micro-sensors 16 of the shutter glasses 10b and 10c change which indicate that the users do not use the glasses, where the condition C12 shown in the FIG. 2 is achieved, so the shutter glasses 10b and 10c switch to the standby mode S2.

If the shutter glasses 10b and 10c are not used for a first time length after the time point t1, the condition C23 is satisfied, and the shutter glasses 10b and 10c start to switch to the sleep mode S3 at the time point t1+T1, which consumes less power than in standby mode S2. In other words, when the user does not use the service of the shutter glasses/electronic device, the electronic device of the present disclosure can automatically switch from the standby mode to the sleep mode to save power.

Assuming that the user wears the shutter glasses 10b again at a time point t2 before the time point t1+T1+T2, the micro-sensor 16 of the shutter glasses 10b senses the user action, and generates the corresponding sensing signal Sn. Accordingly, the condition C31 is satisfied, the shutter glasses 10b is restored to the normal mode S1 from the sleep mode S3, and continues to provide service for the user B.

Provided that the shutter glasses are still not in use by the user C after the time point t1+T1+T2, the condition C34 is thus achieved and then the shutter glasses 10c switch to the turn-off mode of the state S4 from the sleep mode of the state S3. At this time, the shutter glasses 10 barely consume any power. Then, if the user wants to use the shutter glasses again, he/she can manually control the switch 24 of the shutter glasses 10c to restart working.

The first time length T1 may be set as 0 in the embodiment of the present disclosure, which means that no standby mode S2 is used in the state mechanism shown in FIG. 2. Once the sensing signal Sn indicates that the micro-sensor 16 does not sense that the electronic device is carried by the user in the normal mode, it will switch to the sleep mode S3 directly from state S1. In addition, in other embodiments of the present invention, the second time length T2 and the first time length T1 may be set as 0 at the same time, that is, neither state S2 nor S3 is used, hence, the electronic device switches to the turn-off mode of the state S4 from the state S1, if the micro-sensor 16 does not sense that the electronic device is worn by the user.

The standby mode of the state S2 can be retained as a buffer for the normal mode state S1 and sleep mode state S3. In practice, the user may take off or drop the electronic device 10 for a short time (such as fine tuning the wearing of the shutter glasses and/or having a rest); also, the micro-sensor 16 may have a glitch in the sensing signal because of noise. Thus, the first time length T1 is taken as a buffer for these short-term actions. In this way the electronic device 10 switches between state S1 and S2 without changing much operation of the device 10, while the main difference between the state S1 and S2 is the counting of the timer 18; other function controllers (such as the sync controller 22a and the lens controller 22b), the power manager 20, the lens GR and GL, and the communication module 14 of the electronic device 10 keep working either in state S1 or in the state S2 (as shown in FIG. 3). Therefore, users will not feel interrupted because no restore time is needed for operation of most of the functions between the modes S1 and S2. After the device 10 enters state S3, the function controller and the communication module may pause; and the device will need some time to restore to normal operation as in mode S1. For example, the sync controller 22a will perform a phase locking again according to the sync signal Sync for providing the timing sequence signal St.

Similarly, time length T2 is taken as a buffer between the sleep mode S3 and turn-off mode S4. The power consumption of the mode S4 is less than that of the mode S3. However, as the time for restoring from turn-off mode S4 to normal mode S1 is longer than that from S3 to S1, application of sleep mode S3 with buffer time length T2 can prevent the electronic device 10 from switching to the state S4 too frequently.

The turn-off mode of the state S4 can be eliminated in the present disclosure, as well as the switch 24 of the electronic device 10. That means, the user does not have to switch the power source of the electronic device 10 manually, instead, the electronic device controls the power management automatically. When the electronic device 10 is worn by the user, it can switch to the normal mode S1 from the sleep mode S3 automatically; when the electronic device 10 is taken off by the user, it can automatically switch to state S3 from state S2.

The micro-sensor 16 of the electronic device 10 can sense whether the electronic device 10 is worn by the user according to pressure, temperature or light, depending on the type of micro-sensor. For example, the micro-sensor 16 may be a push-button switch, disposed at the position L1 and/or L2 in FIG. 1. When the electronic device 10 is worn by the user, the push-button switch is pressed, indicating that the electronic device 10 is being worn by the user; when the electronic device 10 is taken off by the user, the push-button switch is released, and the micro-sensor 16 can detect that the electronic device 10 is not being worn/carried. In other embodiments, the micro-sensor 16 may be a piezoelectric sensor made from piezoelectric material. Furthermore, in other embodiments, the micro-sensor 16 applied to the shutter glasses also can determine that the shutter glasses are carried when the frame is unfolded. The micro-sensor 16 also can determine whether the electronic device 10 is worn by detecting the temperature around the electronic device.

In some embodiments, the micro-sensor 16 includes a transmitter and a receiver (such as IR emitter and IR receiver), disposed at different positions of the electronic device 10 (such as position L2 and L3); when the electronic device 10 is not worn, the signal sent from the transmitter can be received by the receiver; when the electronic device 10 is worn by the user, the communication path between the transmitter and the receiver may be blocked by the user. By this means, the micro-sensor 16 can detect whether the electronic device 10 is worn. The emitter and the receiver also can be disposed close to each other (or at a same position), so that when the electronic device is worn by the user, the signal sent from the emitter will be reflected on the use then received by the receiver; when the electronic device is not carried, the signal sent from the emitter may not be reflected to the receiver.

The micro-sensor 16 can also include a plurality of sensors, and the micro-sensor 16 may integrate all the sensing results to determine whether the electronic device 10 is carried. For example, if Na sensors among all these sensors indicate that the electronic device 10 is carried, while Nb sensors among all indicate that the electronic device 10 is not carried, if Na>Nb, then the micro-sensor 16 may determine it in the sensing signal Sn (showing in FIG. 1) that the electronic device 10 is worn.

Figure 5:
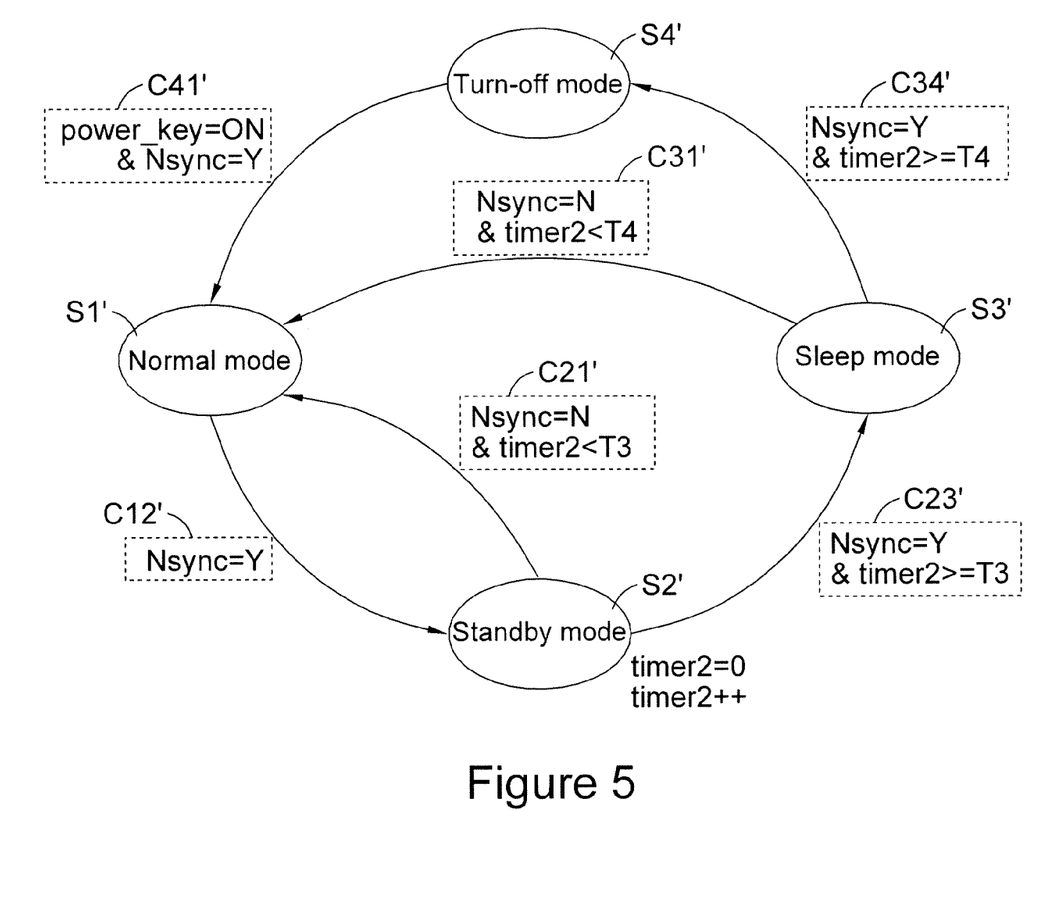
FIG. 5 is a schematic diagram of a state mechanism of the electronic device according to another embodiment of the present disclosure.

As the portable electronic device may receive the information from other signal sources to provide service to the user, the electronic device of the present disclosure may automatically switch the power management mode not only depending on whether the electronic device is worn, but also on whether the signal source is providing the information. FIG. 5 illustrates the state mechanism for electronic device 10 (shown in FIG. 1) that automatically switches the power management according to the signal source 26.

To realize the embodiment shown in the FIG. 5, the communication module 14 of the electronic device 10 can provide a communication indication signal Nsync corresponding to the reception of the sync signal Sc. According to the communication indication signal Nsync, the control circuit 12 can make the electronic device 10 switch to operate in the four states S1'-S4', respectively corresponding to a normal mode, an automatic locking mode, a sleep mode and a turn-off mode; in FIG. 6, a power management of the four modes is shown. In the normal mode S1, the communication module 14 obtains the communication power P1 to operate; after receiving the sync signal Sc from the signal source 26, the communication module 14 not only provides the sync signal Sync to the sync controller 22a according to the sync signal Sc, but also reflects "the sync signal is received" message in the communication indication signal Nsync (expressing as [Nsync=N] in FIG. 5). And the micro-sensor 16, the communication module 14, the left lens GL, the right lens GR, the lens controller 22b, the sync controller 22a, the timer 18 and the power manager 20 all have the corresponding power and operate normally.

When communication module 14 does not receive the sync signal Sc, the communication module 14 will change the signal state of the communication indication signal Nsync for reflecting "unable to receive the sync signal" (expressed as [Nsync=Y]). The condition C12 shown in FIG. 5 is thus satisfied so that the control circuit 12/the electronic device 10 switches to the automatic lock mode S2'; the automatic lock mode can be taken as one type of standby mode as well. After switching to state S2', the timer 18 starts to calculate the time that state S2' lasts; for example, the timer 18 may set the value of a register timer2 as the initial value, and start to perform a periodically accumulating. In addition, in state S2', the sync controller 22a may provide the timing signal St according to the timing in the state S1'. For example, a phase-locked loop may be set in the sync controller 22a, when the communication module 14 can receive the sync signal Sc from the signal source 26 (i.e., in state S1'), the sync controller 22a may lock the phase of the timing signal St to the timing of the sync signal Sc. In state S2', when the sync signal Sc can not be received by the communication module 14, the sync controller 22a may continue to use the timing of state S1' in state S2', so it can continue providing the timing St to the lens controller 22b.

When the control circuit 12 operates in the automatic lock mode of the state S2' for a time less than a time length T3, if the communication module 14 receives the sync signal Sc again, it changes the communication indication signal Nsync back to the signal state of the normal mode ([Nsync=N]), such that the condition C23' is satisfied, the control circuit 12/the electronic device 10 thus switches to state S1' from state S2'.

Figure 6:
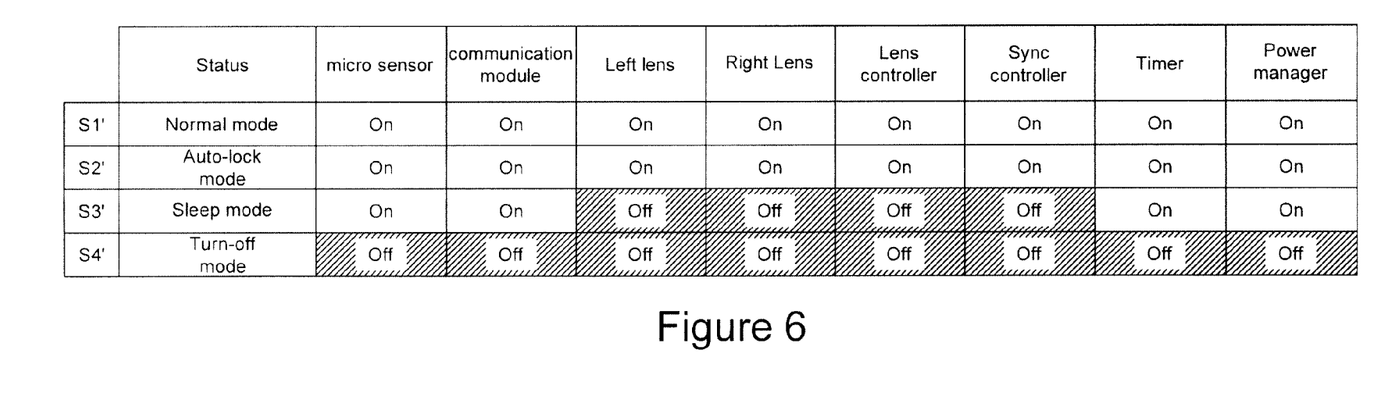
FIG. 6 is a table of the power management of the state mechanism shown in FIG. 5.

Correspondingly, when the control circuit 12 operates in state S2' for a duration longer than a buffer period corresponding to the time length T3 while the communication indication signal Nsync continues reflecting "the sync signal is not received", the condition C23' is satisfied, and thus the control circuit 12 will make the electronic device 10 switch to the sleep mode S3. As shown in FIG. 6, in the electronic device 10, the power manager 20 can terminate the power supply for the left lens GL, the right lens GR, the sync controller 22a and the lens controller 22b; as the shutter glasses of the electronic device 10 operates with the signal source 26, if the electronic device 10 no longer receives the information and signal (such as the sync signal Sc) of the service from the signal source 26, the electronic device 10 may also stop operation so that unnecessary power consumption is avoided. The power manager 20 can continue supplying power to the communication module 14, enabling the communication module 14 to detect existence of the sync signal Sc.

When the control circuit 12 operates in sleep mode (the state S3') for a time less than another time length T4, if the communication module 14 receives the sync signal Sc again, the state of the communication indication signal Nsync (i.e. Nsync=N) changes, the condition C31' is achieved, so the control circuit 12 will make the electronic device 10 switch back to the normal mode S1'.

Correspondingly, when the control circuit 12 remains in the state S3' for a time longer than the time length T4 and the communication indication signal Nsync does not change, it indicates that the timing signal Sc is not restored during the buffer period corresponding to the time interval T4, which meets the condition C34', so the control circuit 12 makes the electronic device 10 switch to the turn-off mode of the state S4'; and the control circuit 12 will stop consuming power which makes the electronic device 10 stop. After the control circuit 12 switched to the turn-off mode of the state S4', the user can reset the power of the electronic device 10 by the switch 24; after the communication module 14 received the sync signal Sc, the control circuit 12/the electronic device 10 can again operates in the normal mode of state S1'.

According to the present disclosure, the power management mode can be switched based on the sync signal, and a mode switch of the electronic device 10 can be controlled based on a predetermined power management protocol between the signal source 26 and the electronic device 10. For example, the 3D video player can send an interrupt signal when it pauses and/or stops playing the 3D image, the communication module 14 can set the signal state of the communication indication signal Nsync according to whether the interrupt signal is received. When the communication module 14 detects the interrupt signal, it can be reflected in the communication indication signal Nsync (i.e., Nsync=Y). When the signal source 26 starts to play the 3D image again, a start signal may be sent to the communication module 14, then it can set the communication indication signal Nsync (such as Nsync=N) accordingly. In this way, the electronic device switches the power management mode of the electronic device 10 according to the state mechanism shown in the FIG. 5.

Similar to the time intervals T1 and T2 shown in the FIG. 2, the time intervals T3 and T4 shown in the FIG. 5 also function as buffers. Short-term events may interfere with the sync signal Sc reception; for example, when an object passes between the user and the signal source 26, the sync signal Sc transmission will be interfered temporarily. Also, the sync signal Sc transmission may be interfered when the user changes pose. Appropriate time interval T3 and T4 are desirable as a buffer period, so that unnecessary mode switching can be avoided.

The embodiment as shown in the FIG. 2 and FIG. 5 can be integrated together or independently in application. For example, the electronic device 10 may perform the power management based on the state mechanism shown in the FIG. 2, where the communication module 14 of the electronic device 10 does not need to provide the communication indication signal Nsync. In another embodiment, the electronic device 10 may only implement the power management shown in the FIG. 5 where the micro-sensor is not used in the electronic device 10.

In another embodiment, the electronic device 10 can integrate the sensing signal Sn of the micro-sensor 16 with the communication indication signal Nsync of the communication module 14 for automatic power management mode switching. For instance, when the control circuit 12 operates in the normal mode, when the sensing signal Sn or the communication indication signal Nsync changes, it indicates that the user does not wear and/or the signal source 26 does not supply the information (such as the sync signal Sc); as a result, the control circuit 12 may first switch to the buffer standby mode, then further switch to the sleep mode or the turn-off mode after an appropriate buffer period. In the buffer period and/or sleep mode, if both of the sensing signal Sn and the communication indication signal Nsync are restored to the normal mode, it indicates that the user wears the electronic device again and/or the signal source 26 provides the necessary information and, as a result, the control circuit 12 can switch back to the normal mode.

In the embodiment shown in the FIG. 2 and FIG. 5, two modes (states) exist between the normal mode and the turn-off mode according to the present disclosure, however it should not limit the scope of the invention; more modes (states) can be arranged between the normal mode and the turn-off mode. For example, if a plurality of function controllers are applied in the electronic device for controlling different functions of the electronic device, then it is possible to apply different sleep modes to those function controllers.

The present disclosure need not only be applied to shutter glasses, but also can be used in other portable electronic devices, such as a wireless headset; the function controller may be an audio controller, for controlling the speaker of the headset. The signal sources may be a broadcast station, a wireless multimedia player and/or a mobile phone.

In conclusion, compared to the manual power management in prior art, the portable electronic device of the present disclosure can automatically switch operating modes (whether it is carried and/or whether it receives a signal from a signal source) so that more efficient power management can be achieved, as such, power consumption of the portable electronic device can be decreased, and usage time can be extended.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A portable electronic device having automatic power supply mode switching, comprising:
   a micro-sensor, for sensing whether the portable electronic device is worn by a user to generate a sensing signal accordingly; and
   a control circuit, coupled to the micro-sensor, for determining whether to switch a power supply mode according to the sensing signal and a present mode,
   wherein, if the sensing signal changes when the control circuit operates in a normal mode, the control circuit switches to a standby mode,
   wherein the control circuit includes a timer, for generating a timing result, and when the control circuit operates in the standby mode, the control circuit is configured to switch to the normal mode according to the timing result and whether the sensing signal changes,
   wherein the timer is configured to begin operation in response to a change of the sensing signal, and
   wherein, if the timing result is less than a first time length when the control circuit operates in the standby mode while the sensing signal changes, the control circuit is configured to switch to the normal mode.

2. The electronic device as claimed in claim 1, wherein, if the timing result is longer than the first time length when the control circuit operates in the standby mode, the control circuit is configured to switch to a sleep mode.

3. The electronic device as claimed in claim 2, wherein, if the timing result is less than a second time length when the control circuit operates in the sleep mode while the sensing signal changes, the control circuit is configured to switch to the normal mode.

4. The electronic device as claimed in claim 2, wherein, if the timing result is equal to a second time interval when the control circuit operates in the sleep mode, the control circuit is configured to switch to a turn-off mode.

5. The electronic device as claimed in claim 4, wherein, when the control circuit operates in the turn-off mode, the control circuit stops consuming power.

6. The electronic device as claimed in claim 4, further comprising:
   a switch, coupled to the control circuit, that is controllable by a user;
   wherein when the switch is turned on while the control circuit is in turn-off mode the control circuit switches to the normal mode.

7. The electronic device as claimed in claim 2, wherein, the control circuit comprises:
   a power manager, selectively providing power according to the present mode of the control circuit; and
   a function controller, coupled to the power manager, to receive function power according to the present mode.

8. The electronic device as claimed in claim 7, wherein, when the control circuit operates in the normal mode or in the sleep mode, the power manager further provides sensing power to the micro-sensor to perform sensing.

9. The electronic device as claimed in claim 7, being a shutter glasses for viewing 3D image, wherein the function controller is a lens controller, the electronic device further comprising:
   two lenses, coupled to the function controller;
   wherein the function controller receives the function power to drive the two lenses to switch between shielding and non-shielding states.

10. The electronic device as claimed in claim 7, further comprising:
- a communication module, coupled to the function controller;
- wherein the function controller receives the function power to drive the communication module.

11. The electronic device as claimed in claim 1, further including:
- a communication module, for detecting whether a predetermined communication signal exists to generate an indication signal accordingly;
- wherein, if one of the sensing signal and the indication signal changes when the control circuit operates in the normal mode, the control circuit is configured to switch to the standby mode.

12. The electronic device as claimed in claim 11, wherein, when the control circuit operates in the standby mode, and if the control circuit operates in the standby mode for a duration shorter than a first time length when both the sensing signal and the indication signal are equivalent to those in the normal mode, the control circuit is configured to switch to the normal mode.

13. An electronic device, comprising:
- a communication module, detecting whether a predetermined communication signal is present to generate an indication signal accordingly; and
- a control circuit, coupled to the communication module, configured to switch to a standby mode if the indication signal changes when the control circuit operates in a normal mode,
- wherein the control circuit includes a timer, for generating a timing result, and when the control circuit operates in the standby mode, the control circuit is configured to switch to the normal mode according to the timing result and whether the indication signal changes,
- wherein the timer is configured to begin operation in response to switching to the standby mode, and
- wherein, when the control circuit operates in the standby mode, and if the control circuit operates in the standby mode for a duration shorter than a first time length when the sensing signal changes, the control circuit is configured to switch to the normal mode.

14. The electronic device as claimed in claim 13, wherein, when the control circuit operates in the standby mode, and if the control circuit operates in the standby mode for a duration longer than or equal to a first time length, the control circuit is configured to switch to a sleep mode.

15. The electronic device as claimed in claim 14, wherein, when the control circuit operates in the sleep mode, and if the control circuit operates in the sleep mode for a duration shorter than a second time length when the sensing signal changes, the control circuit is configured to switch to the normal mode.

16. The electronic device as claimed in claim 14, wherein, when the control circuit operates in the sleep mode, if the control circuit operates in the sleep mode for a duration longer than a second time length, the control circuit is configured to switch to a turn-off mode.

17. A portable electronic device having automatic power supply mode switching, comprising:
- a micro-sensor, for sensing whether the portable electronic device is worn by a user to generate a sensing signal accordingly; and
- a control circuit, coupled to the micro-sensor, for determining whether to switch a power supply mode according to the sensing signal and a present mode,
- wherein, if the sensing signal changes when the control circuit operates in a normal mode, the control circuit switches to a standby mode,
- wherein the control circuit includes a timer, for generating a timing result, and when the control circuit operates in the standby mode, the control circuit is configured to switch to the normal mode according to the timing result and whether the sensing signal changes,
- wherein the timer is configured to begin operation in response to a change of the sensing signal, and
- wherein, if the timing result is longer than the first time length when the control circuit operates in the standby mode, the control circuit is configured to switch to a sleep mode.

* * * * *